US006631635B2

(12) United States Patent
Hanazaki et al.

(10) Patent No.: US 6,631,635 B2
(45) Date of Patent: Oct. 14, 2003

(54) FAULT DIAGNOSTIC APPARATUS OF EVAPORATION PURGE SYSTEM

(75) Inventors: Ryoichi Hanazaki, Tokyo (JP); Masaki Nakamichi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/997,991

(22) Filed: Dec. 3, 2001

(65) Prior Publication Data

US 2002/0189596 A1 Dec. 19, 2002

(30) Foreign Application Priority Data

Jun. 15, 2001 (JP) ....................................... 2001-181828

(51) Int. Cl.[7] ............................................... G01M 15/00
(52) U.S. Cl. ...................................... 73/118.1; 73/118.1
(58) Field of Search ............................... 73/116, 117.2, 73/118.1; 123/198 D, 516, 518, 519, 520, 521

(56) References Cited

U.S. PATENT DOCUMENTS 6,308,559 B1 * 10/2001 Davison .................... 73/118.1

FOREIGN PATENT DOCUMENTS

JP 5-195883 8/1993 .......... F02M/25/08

* cited by examiner

*Primary Examiner*—Kamand Cuneo
*Assistant Examiner*—Monica D. Harrison
(74) *Attorney, Agent, or Firm*—Sughrue Mion, PLLC

(57) ABSTRACT

To obtain a fault diagnostic apparatus of an evaporation purge system by which a fault detection of a purge vent valve can accurately be performed with no wrong judgment. There are included: a tank internal pressure detecting means for detecting an internal pressure of a fuel tank; a valve control means for controlling closing and opening of a purge control valve and the purge vent valve; a purge control valve fault detecting means for detecting a fault of the purge control valve on the basis of a detected output of the tank internal pressure detecting means when the purge control valve and the purge vent valve are closed; and a purge vent valve fault detecting means for detecting a fault of the purge vent valve on the basis of the detected output of the tank internal pressure detecting means when the purge control valve and the purge vent valve are open, and the purge vent valve fault detecting means performs the fault detection of the purge vent valve only when the purge control valve fault detecting means judges that the purge control valve is normal.

6 Claims, 3 Drawing Sheets

P1 : FAULT JUDGING VALUE OF PURGE CONTROL VALVE
P2 : FAULT JUDGING VALUE OF PURGE VENT VALVE

FAULT DIAGNOSTIC APPARATUS OF EVAPORATION PURGE SYSTEM

BACKGROUND OF THE INVENTION

1. Field of the Invention

The present invention relates to a fault diagnostic apparatus of an evaporation purge system which performs the processing of evaporated fuel of an internal combustion engine.

2. Description of the Prior Art

FIG. 3 is a block diagram showing one example of the general evaporation purge system.

In the drawing, reference numeral 1 denotes a fuel tank, and reference numeral 2 denotes a canister, and reference numeral 3 denotes a purge passage, and reference numeral 4 denotes a purge control valve, and reference numeral 5 denotes a purge vent valve, and reference numeral 6 denotes an intake hole, and reference numeral 7 denotes an atmospheric passage, and reference numeral 8 denotes a purge passage, and reference numeral 9 denotes a vapor passage, and reference numeral 10 denotes an intake passage, and reference numeral 11 denotes a throttle valve, and reference numeral 12 denotes a throttle opening sensor, and reference numeral 13 denotes an air flow meter, and reference numeral 14 denotes an air cleaner, and reference numeral 15 denotes a pressure sensor, and reference numeral 16 denotes a microcomputer, and reference numeral 17 denotes a warning lamp, and reference numeral 18 denotes a fuel injection valve.

In such an evaporation purge system, in the case where an abnormality is caused in the purge vent valve 5, and it remains in the closed state and does not operate, there is such a possibility that the evaporation purge system becomes in the over negative pressure state at the time of the normal purge.

Therefore, as means for detecting a fault of the purge vent valve, conventionally, a fault diagnostic apparatus has been proposed, which detects a fault of the purge vent valve when the tank internal pressure becomes a specified value or less at the time of the normal purge when the purge control valve and the purge vent valve are set at the opening state, as shown, for example, in Japanese Patent Laid-Open No. 5-195883.

BRIEF SUMMARY OF THE INVENTION

Object of the Invention

However, in the case of such a conventional fault diagnostic apparatus, there has been such a problem that if the fault diagnosis of the purge vent valve is performed when the purge control valve becomes in trouble to remain in the opening state, a lot of purges are introduced, and consequently, even if the purge vent valve is normal, the tank internal pressure becomes the specified value or less and a wrong fault detection may be performed.

The present invention has been achieved for solving such a problem, and it is an object to provide a fault diagnostic apparatus of an evaporation purge system by which the fault detection of the purge vent valve can accurately be performed.

Summary of the Invention

A fault diagnostic apparatus of an evaporation purge system according to the invention of claim 1 including: a fuel tank; a canister having an intake hole; a purge control valve provided in a purge passage connecting the above described canister and an intake system of an internal combustion engine; and a purge vent valve for opening and closing the intake hole of the above described canister, which comprises: tank internal pressure detecting means for detecting internal pressure of the above described fuel tank; valve control means for controlling closing and opening of the above described purge control valve and the above described purge vent valve; purge control valve fault detecting means for detecting a fault of the above described purge control valve on the basis of detected output of the above described tank internal pressure detecting means at the time of the closed state of the above described purge control valve and the above described purge vent valve; and purge vent valve fault detecting means for detecting a fault of the above described purge vent valve on the basis of detected output of the above described tank internal pressure detecting means at the time of the opening state of the above described purge control valve and the above described purge vent valve, wherein the above described purge vent valve fault detecting means performs the fault detection of the above described purge vent valve, only when the above described purge control valve fault detecting means judges that the above described purge control valve is normal.

The fault diagnostic apparatus of an evaporation purge system according to the invention of claim 2 is the apparatus according to the invention of claim 1, wherein the above described purge control valve fault detecting means judges that the above described purge control valve is in trouble, when the tank internal pressure detected by the above described tank internal pressure detecting means becomes lower than a specified value in the case where the above described purge control valve and the above described purge vent valve are set to the closed state by the above described valve control means.

The fault diagnostic apparatus of an evaporation purge system according to the invention of claim 3 is the apparatus according to the invention of claim 1 or 2, wherein the above described purge vent valve fault detecting means judges that the above described purge vent valve is in trouble, when the tank internal pressure detected by the above described tank internal pressure detecting means becomes lower than a specified value in the case where the above described purge control valve and the above described purge vent valve are set to the opening state by the above described valve control means.

DETAILED DESCRIPTION OF THE PREFERRED EMBODIMENT

The preferred embodiment of the present invention will be described below on the basis of drawings.

Embodiment 1

Figure 1:
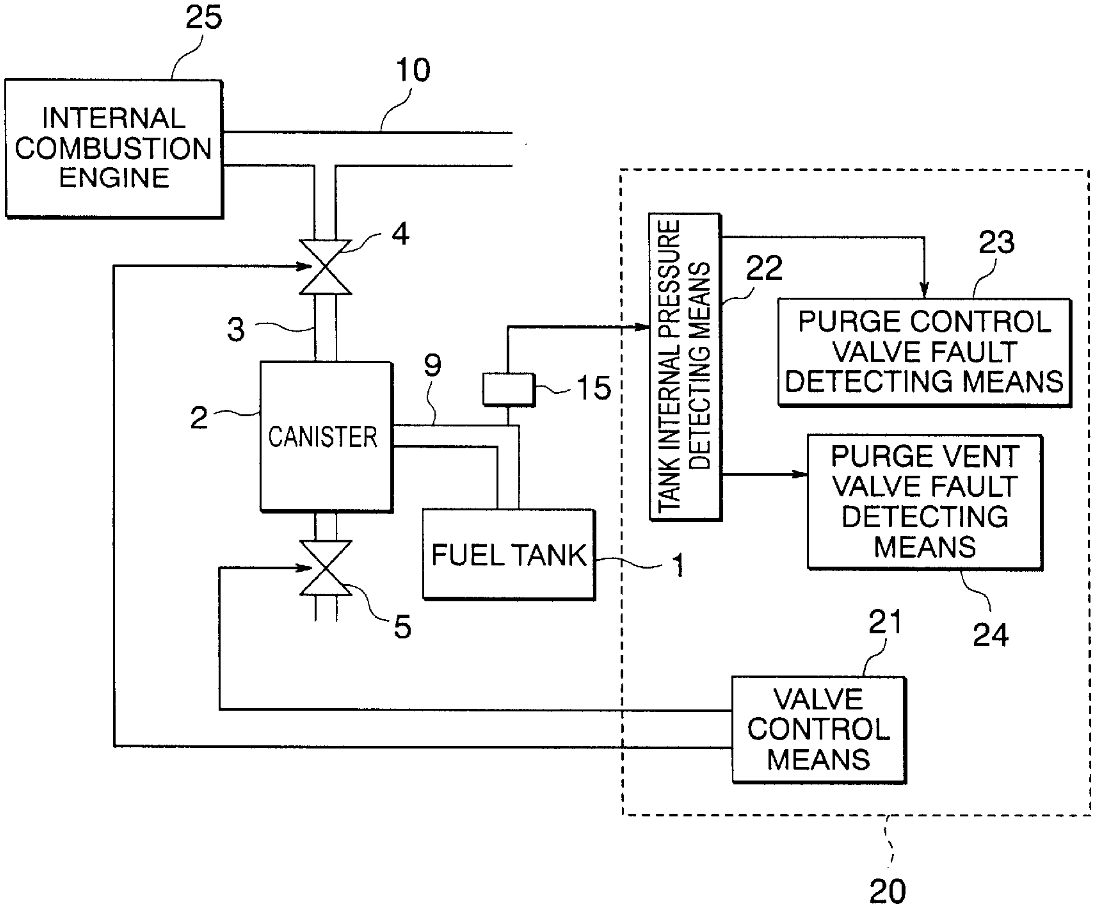
FIG. 1 is a block diagram showing a fault diagnostic apparatus of an evaporation purge system according to Embodiment 1 of the present invention.

FIG. 1 is a block diagram showing a fault diagnostic apparatus of an evaporation purge system according to Embodiment 1 of the present invention.

In the drawing, reference numeral 1 denotes a fuel tank, and reference numeral 2 denotes a canister having an intake hole, and reference numeral 3 denotes a purge passage connecting the canister 2 with an intake passage 10 of an internal combustion engine 25, and reference numeral 4 denotes a purge control valve provided in this purge passage 3, and reference numeral 5 denotes a purge vent valve for opening and closing the intake hole of the canister 2, and reference numeral 9 denotes a vapor passage connecting the fuel tank 1 and the canister 2, and reference numeral 15 denotes a pressure sensor, and reference numeral 20 denotes a microcomputer, and reference numeral 21 denotes valve control means which sets the purge control valve 4 and the purge vent valve 5 at the closed or opening state, respectively, and reference numeral 22 denotes tank internal pressure detecting means which detects the internal pressure of the fuel tank 1 through the pressure sensor 15.

Reference numeral 23 denotes purge control valve fault detecting means which detects the purge control valve 4 being in trouble when the tank internal pressure detected by the tank internal pressure detecting means 22 becomes lower than a specified value in the case where the purge control valve 4 and the purge vent valve 5 are set to the closed state by the valve control means 21, and reference numeral 24 denotes purge vent valve fault detecting means which detects the purge vent valve 5 being in trouble when the tank internal pressure detected by the tank internal pressure detecting means 22 becomes lower than a specified value in the case where the purge control valve 4 and the purge vent valve 5 are set to the opening state by the valve control means 21. Furthermore, the valve control means 21, the tank internal pressure detecting means 22, the purge control valve fault detecting means 23, and the purge vent valve fault detecting means 24 are contained in the microcomputer 20.

Figure 2:
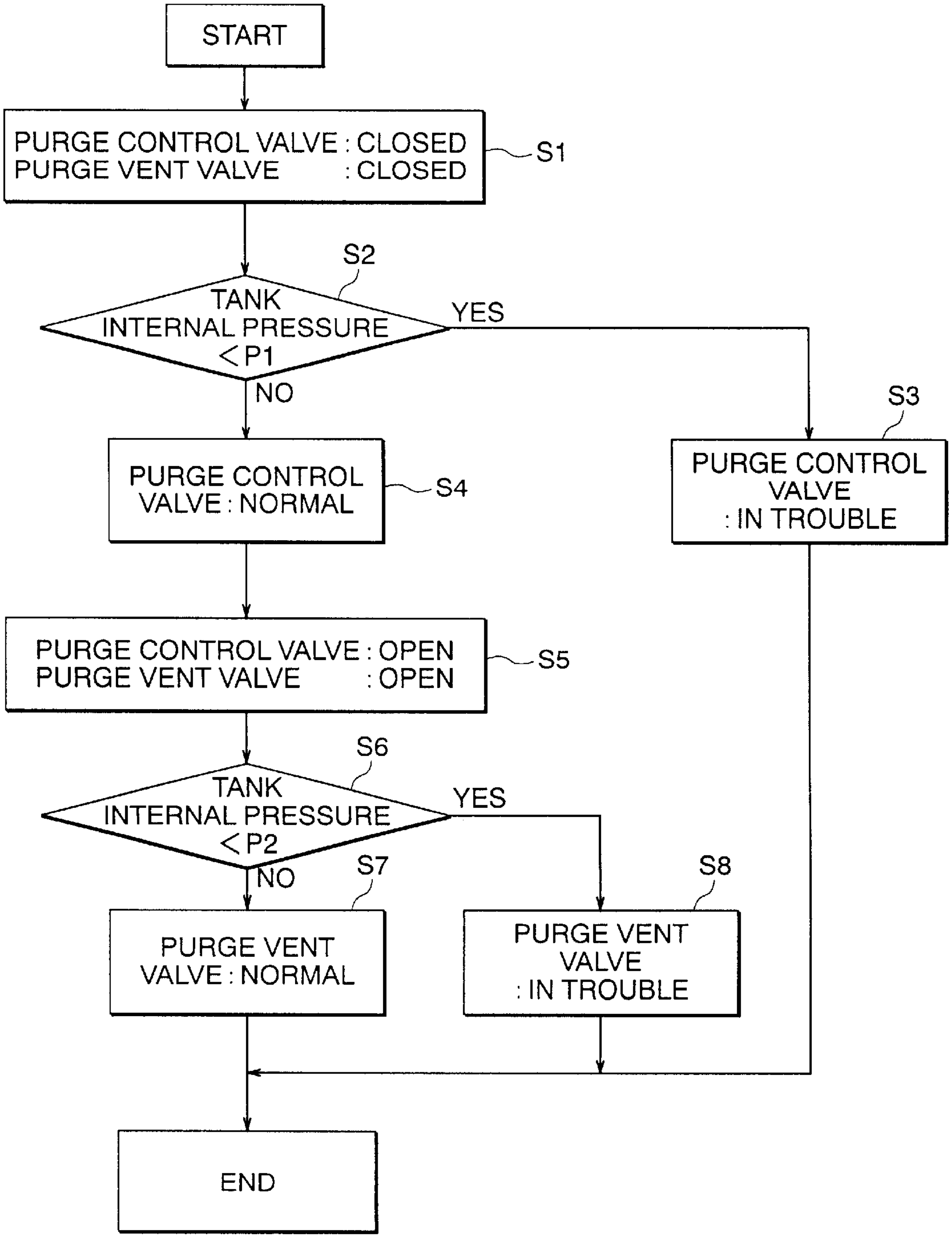
FIG. 2 is a flow chart to be submitted for an operational explanation in Embodiment 1 of the present invention.
Figure 3:
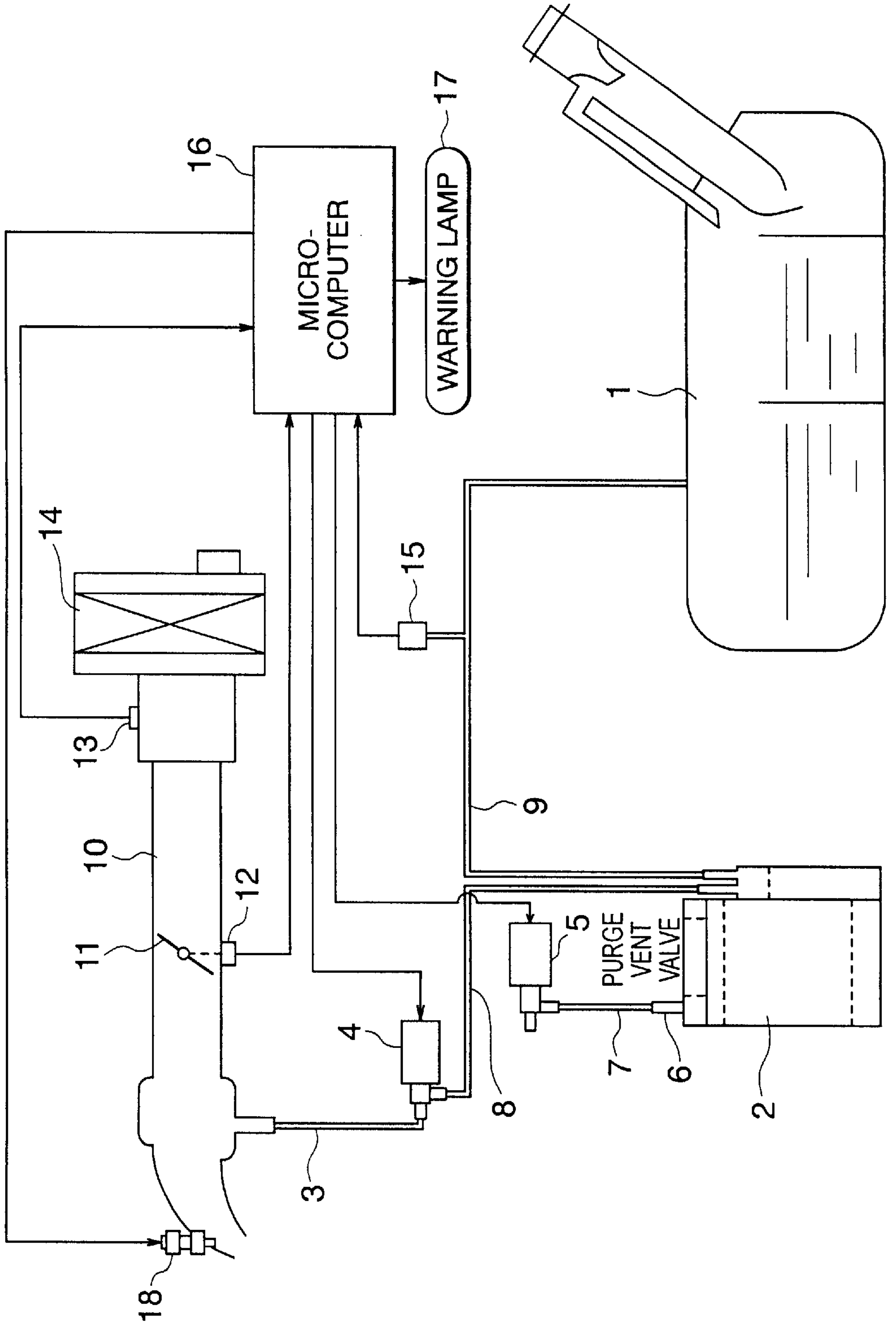
FIG. 3 PRIOR ART
FIG. 3 is a block diagram showing a general evaporation purge system.

Next, the fault judging action will be described by referring to a flow chart in FIG. 2.

First, at step S1, the purge control valve 4 and the purge vent valve 5 are set to the closed state by the valve control means 21. Next, at step S2, the purge control valve fault detecting means 23 judges whether or not the tank internal pressure detected by the tank internal pressure detecting means 22 is lower than a specified value, that is, the fault judging value P1 of the purge control valve 4 or not, and if it is lower, at step S3, it is judged that the purge control valve 4 is in trouble, and the fault judging action finishes as it is.

On the other hand, at step S2, if the tank internal pressure is not lower than the fault judging value P1 of the purge control valve 4, it is judged that the purge control valve 4 is normal, and the step advances to step S4. At step S4, the purge control valve 4 and the purge vent valve 5 are set to the opening state by the valve control means 21.

Next, at step S6, the purge vent valve fault detecting means 24 judges whether the tank internal pressure detected by the tank internal pressure detecting means 22 is lower than a specified value, that is, the fault judging value P2 of the purge vent valve 5 or not, and if it is not lower, at step S7, it is judged that the purge vent valve 5 is normal, and if it is lower, at step S8, it is judged that the purge vent valve 5 is in trouble, and the series of fault judging actions finish.

Thus, in the case of the present embodiment, the fault detection of the purge vent valve is performed only when the purge control valve is normal, and therefore, the fault detection of the purge vent valve can accurately be performed with no wrong judgment.

As mentioned above, according to the present invention as claimed in claim 1, there is such an advantageous effect that the fault detection of the purge vent valve can accurately be performed with no wrong judgment.

What is claimed is:

1. In an evaporation purge system including:

a fuel tank;

a canister having an intake hole;

a purge control valve provided in a purge passage connecting said canister and an intake system of an internal combustion engine; and a purge vent valve for opening and closing the intake hole of said canister, a fault diagnostic apparatus of an evaporation purge system, comprising:

tank internal pressure detecting means for detecting internal pressure of said fuel tank;

valve control means for controlling closing and opening of said purge control valve and said purge vent valve;

purge control valve fault detecting means for detecting a fault of said purge control valve on the basis of detected output of said tank internal pressure detecting means, at the time of the closed state of said purge control valve and said purge vent valve; and purge vent valve fault detecting means for detecting a fault of said purge vent valve on the basis of detected output of said tank internal pressure detecting means, at the time of the opening state of said purge control valve and said purge vent valve, wherein said purge vent valve fault detecting means performs fault detection of said purge vent valve, only when said purge control valve fault detecting means judges that said purge control valve is normal.

2. The fault diagnostic apparatus of an evaporation purge system according to claim 1, wherein said purge control valve fault detecting means judges that said purge control valve is in trouble, when the tank internal pressure detected by said tank internal pressure detecting means becomes lower than a specified value, in the case where said purge control valve and said purge vent valve are set to the closed state by said valve control means.

3. The fault diagnostic apparatus of an evaporation purge system according to claim 1, wherein said purge vent valve fault detecting means judges that said purge vent valve is in trouble, when the tank internal pressure detected by said tank internal pressure detecting means becomes lower than a specified value, in the case where said purge control valve and said purge vent valve are set to the opening state by said valve control means.

4. An evaporation purge system comprising:

a fuel tank;

a canister having an intake hole;

a purge control valve provided in a purge passage connecting said canister and an intake system of an internal combustion engine;

a purge vent valve for opening and closing the intake hole of said canister; and a fault diagnostic apparatus including a) tank internal pressure detecting means for detecting internal pressure of said fuel tank;

b) valve control means for controlling closing and opening of said purge control valve and said purge vent valve;

c) purge control valve fault detecting means for detecting a fault of said purge control valve on the basis of detected output of said tank internal pressure detecting means, at the time of the closed state of said purge control valve and said purge vent valve; and d) purge vent valve fault detecting means for detecting a fault of said purge vent valve on the basis of detected output of said tank internal pressure detecting means, at the time of the opening state of said purge control valve and said purge vent valve, wherein said purge vent value fault detecting means performs fault detection of said purge vent valve, only when said purge control valve fault detecting means judges that said purge control valve is without a fault.

5. The evaporation purge system according to claim 4, wherein said purge control valve fault detecting means judges that said purge control valve has a fault when the tank internal pressure detected by said tank internal pressure detecting means becomes lower than a specified value.

6. The evaporation purge system according to claim 4, wherein said purge vent value fault detecting means judges that said purge vent valve has a fault when the tank internal pressure detected by said tank internal pressure detecting means becomes lower than a specified value.

* * * * *